July 14, 1931.  A. A. REDFORD  1,814,262
DOLLY
Filed July 21, 1930
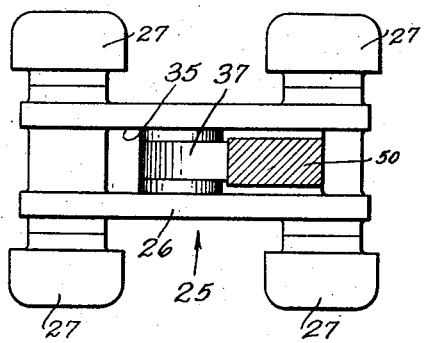
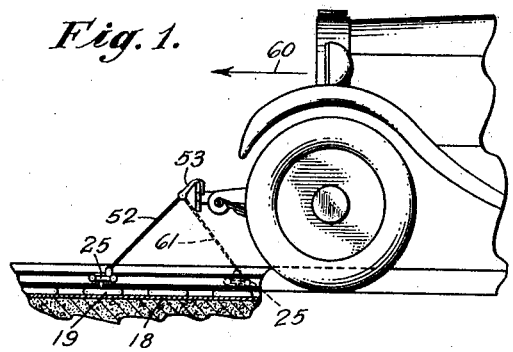
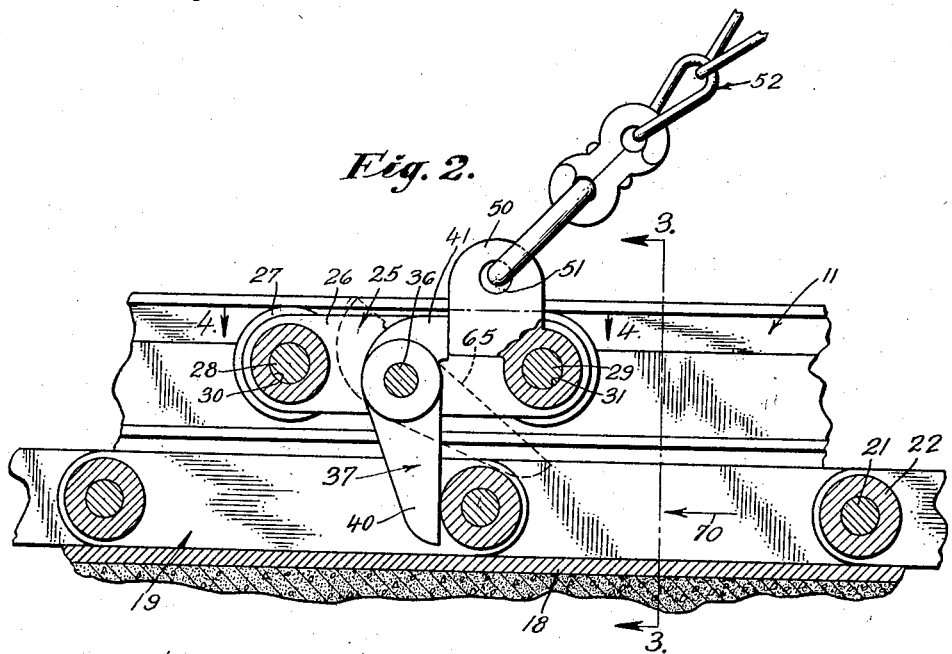
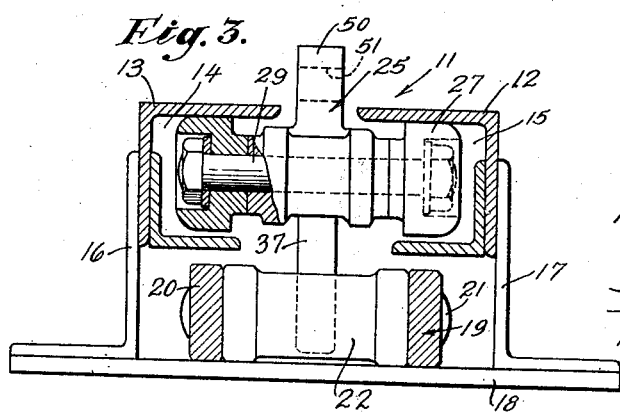
INVENTOR:
ALGENON A. REDFORD
BY
Ford W. Harris
ATTORNEY.

Patented July 14, 1931

1,814,262

UNITED STATES PATENT OFFICE

ALGENON A. REDFORD, OF HOLLYWOOD, CALIFORNIA

DOLLY

Application filed July 21, 1930. Serial No. 469,618.

My invention relates to a device for towing movable bodies and is particularly adapted for use as a dolly in hitching a wheeled vehicle, such as an automobile, to a driven member, such as an endless chain, for the purpose of towing the automobile.

This manner of towing a vehicle is widely used in connection with automobile cleaning and washing establishments. The use, however, of an ordinary type of dolly or a mere hook for the purpose above described is unsatisfactory inasmuch as it entails the somewhat dangerous practice of manually attaching the dolly or hook to the endless chain while the same is in motion. I have designed my device with the purpose of obviating this danger.

It is the general object of my invention to provide a dolly device utilizing a towing member in the form of a chain or other flexible means adapted to be secured to a vehicle to be towed, after which the dolly is placed in register with a track whereupon the dolly is drawn along the track by a movement imparted to the vehicle until an engaging means included in the device automatically engages the driven member in such a manner as to tow the vehicle therewith.

Other objects of my invention will be seen from a perusal of the following specification, the accompanying drawings and the appended claims.

Referring to the drawings in which:

Fig. 1 is a view illustrating the utility of my invention for use in hitching an automobile to an endless chain for the purpose of towing the vehicle. It should be understood that I have shown my device in connection with an automobile merely as an illustration and do not wish to limit the scope of my invention to use in any particular industry.

Fig. 2 is a longitudinal sectional view taken on a median plane through the dolly and the cooperating track and driven member of the invention.

Fig. 3 is a vertical section taken as indicated by the line 3—3 of Fig. 2.

Fig. 4 is a partially sectioned plan view taken as indicated by the line 4—4 of Fig. 2.

Referring particularly to Figs. 2 and 3 I show a horizontally extending track generally designated by the numeral 11 comprising mating pairs of angle members 12 and 13, positioned so as to form inwardly facing channels 14 and 15. The channels 14 and 15 are supported by bracket members 16 and 17 in spaced relationship with a base plate 18.

Slidably supported on the base plate 18 parallel with and in a plane below the track 11 is a chain 19 of an ordinary type comprising couplers 20 connected by pins 21, the couplers 20 being spaced in the usual manner by bushings 22.

Coming now to the more pertinent part of my invention I show a dolly generally designated by the numeral 25 which comprises a carriage 26 having rollers 27, adapted to be received by and rolled longitudinally in, the channels 14 and 15. The rollers 27 are rotatably mounted on the outer ends of a pair of shafts 28 and 29 extending through lateral bores 30 and 31 provided in either end of the carriage 25, as indicated in Figs. 2 and 4.

A central vertical opening 35 is provided in the carriage 26 in which is pivotally supported, as by a pin 36, an engager 37 of the invention. The engager 37 is provided with a downwardly projecting arm 40 adapted to extend into one of the openings in the chain 19 between the pins 21. The engager 37 is also provided with an upwardly extending finger 41 adapted to serve as a stop having a purpose which will be hereinafter described.

Formed integrally with and extending upwardly from the carriage 26 is a lug 50 provided with an opening 51 to which a towing means 52 in the form of a chain is connected, the lug 50 also serving as an abutment which the stop 41 contacts when the arm 40 is in the vertical downward position shown in Fig. 2. The chain 52 is provided at its other end with a hook 53 which is adapted to be hooked to a vehicle as shown in Fig. 1.

The operation of my device is as follows:

When it is desired to hitch a vehicle to the chain 19 for the purpose of towing the vehicle, the hook 53 is first connected to the vehicle at some convenient place, such as is shown in Fig. 1, to the bumper of the automobile shown, and the dolly 25 is subsequently placed in register with the track 11. The vehicle is then moved forwardly in the direction of the arrow 60 of Fig. 1 whereupon the dolly will be drawn along the track 11 as indicated by the dotted lines 61 of Fig. 1. During this movement of the vehicle and the dolly 25 it will be seen that the engager 37 will ride over the bushings 22 of the chain 19 as indicated by the dotted lines 65 of Fig. 2. When the forward movement of the vehicle and the dolly 25 relative to the chain 19 ceases, it will be seen that a subsequent movement of the chain 19 in the direction of the arrow 70 of Fig. 2 will cause one of the bushings 22 thereof to contact the arm 40 as indicated in solid lines in Fig. 2 and will cause the dolly 25 and the vehicle, by virtue of the connecting chain 53 to be towed with the chain 19.

From the foregoing description it will be apparent that the automatic engagement of the dolly 25 with the chain 19 is an important feature of the invention from a standpoint of safety of operation, inasmuch as an operator has merely to place the dolly 25 in register with the track 11 and then push the vehicle forwardly until the dolly engages the chain, precluding the possibility of injury to the operator.

Another important feature lies in the fact that a plurality of vehicles may be towed by the chain 19 in any desired spaced relationship, this spacing being accomplished by moving one vehicle forwardly relative to the vehicle ahead until the desired space intervenes, whereupon the dolly 25 automatically engages the chain 19 maintaining this spaced relationship throughout the entire travel of the vehicles.

Although I have herein shown and described only one complete embodiment of my invention it should be understood that various features thereof might be changed and numerous embodiments might be devised by those skilled in the art without departing from the spirit and scope of my invention.

I claim as my invention:

1. In combination: a track; a driven member movable longitudinally of and adjacent to said track; and a dolly comprising a carriage movable on said track, tow means secured to said carriage and adapted to be connected to a towable body, and an engager mounted on said carriage and adapted to engage said driven member for the purpose of towing said towable body with said driven member.

2. In combination: a track; a driven member movable longitudinally of and adjacent to said track; a carriage movable on said track; tow means secured to said carriage and adapted to be connected to a towable body; and an engager mounted on said carriage and adapted to engage said driven member when said driven member moves in one direction relative to said carriage, for the purpose of towing said towable body with said driven member.

3. In combination: a track; a driven member movable longitudinally of and adjacent to said track; a carriage movable on said track; tow means secured to said carriage and adapted to be connected to a towable body; and an engager mounted on said carriage and operable to permit relative movement between said carriage and said driven member in one direction, and to prevent relative movement between these mentioned elements in an opposite direction.

4. In combination: a track; a driven member providing openings forming engageable surfaces therein and being movable longitudinally of and adjacent to said track; a carriage movable on said track; tow means secured to said carriage and adapted to be connected to a towable body; and an engager mounted on said carriage and adapted to engage said engageable surfaces when said driven member moves in one direction relative to said carriage for the purpose of towing said towable body with said driven member.

5. In combination: a track; a driven member movable longitudinally of and adjacent to said track; a carriage movable on said track; tow means secured to said carriage and adapted to be connected to a towable body; and an engager mounted on said carriage and adapted to automatically engage said driven member, when said driven member moves in one direction relative to said carriage, for the purpose of towing said towable body with said driven member.

6. In combination: a track; a driven member providing openings forming engageable surfaces therein and being movable longitudinally of and adjacent to said track; a carriage movable on said track; tow means secured to said carriage and adapted to be connected to a towable body; and an engager mounted on said carriage and adapted to automatically engage said engageable surfaces when said driven member moves in one direction relative to said carriage for the purpose of towing said towable body with said driven member.

7. In a device for towing a movable body, the combination of: a track; a driven member providing openings forming engageable surfaces therein and being movable longitudinally of and adjacent to said track; a carriage movable on said track; tow means secured to said carriage and adapted to be connected to a movable body; and an engager mounted on said carriage and operable to permit said carriage to be moved relative to said track and said driven member by said movable body when movement is imparted thereto in one direction, and said engager being operable to automatically engage one of said engageable surfaces when said driven member subsequently moves relative to said carriage and said movable body in the same direction, for the purpose of towing said movable body with said driven member.

8. In a device for towing a movable body, the combination of: a track comprising a pair of inwardly facing channel members; a driven member providing openings forming engageable surfaces therein and being movable parallel with and adjacent to said track; a carriage provided with rollers adapted to roll in said channels; tow means secured to said carriage and adapted to be connected to a movable body; an engager mounted on said carriage and providing an arm adapted to extend into said openings; and cooperating means included in said engager and said carriage for causing said arm to frictionally ride over said engageable surfaces when said carriage is moved in one direction relative to said driven member, and for causing said arm to engage said engageable surfaces when said driven member moves in the same direction relative to said carriage, so that said movable body will be towed with said driven member.

9. In a device for towing a movable body, the combination of: a track comprising a pair of inwardly facing channel members; a driven member providing openings forming engageable surfaces therein and being movable parallel with and adjacent to said track; a carriage provided with rollers adapted to roll in said channels; tow means secured to said carriage and adapted to be connected to a movable body; an engager pivotally mounted on said carriage and providing an arm adapted to extend into one of said openings; and cooperating stop means on said carriage and said engager for causing said arm to frictionally ride over said engageable surfaces when said carriage is moved in one direction relative to said driven member, and for causing said arm to engage said engageable surfaces when said driven member moves in the same direction relative to said carriage, so that said movable body will be towed with said driven member.

In testimony whereof, I have hereunto set my hand at Los Angeles, California, this 16th day of July, 1930.

ALGENON A. REDFORD.